United States Patent [19]

Spath

[11] Patent Number: 5,606,939

[45] Date of Patent: Mar. 4, 1997

[54] VALVE ACTUATION ASSEMBLY

[75] Inventor: Mark J. Spath, Spencerport, N.Y.

[73] Assignee: General Motors Corporation, Detroit, Mich.

[21] Appl. No.: 550,512

[22] Filed: Oct. 30, 1995

[51] Int. Cl.$^6$ .................................................. F01L 1/14
[52] U.S. Cl. ........................................... 123/90.5; 74/569
[58] Field of Search ........................ 123/90.42, 90.48, 123/90.5; 74/569

[56] References Cited

U.S. PATENT DOCUMENTS

| | | | |
|---|---|---|---|
| 5,261,361 | 11/1993 | Speil | 123/90.5 |
| 5,361,733 | 11/1994 | Spath et al. | 123/90.16 |
| 5,385,124 | 1/1995 | Hillebrand et al. | 123/90.5 |

*Primary Examiner*—Weilun Lo
*Attorney, Agent, or Firm*—Karl F. Barr, Jr.

[57] ABSTRACT

A valve actuation assembly is disclosed for use on an internal combustion engine. Retention of the roller shafts within the lifter body is through a wire c-ring which engages circumjacent internal and external ring grooves located in the shaft opening in the lifter body and on the outer circumference of the roller shaft. The c-shaped wire ring is formed so that, in its free state, it has an outside diameter larger than the groove in the shaft opening but, in an elastically collapsed state, its outside diameter is no larger than the shaft diameter. When the roller-shaft assembly is installed in the shaft opening of the lifter body, the c-shaped wire ring is elastically collapsed into the shaft groove. As such, the shaft and wire ring may be inserted into the shaft openings in the lifter body with little effort until the shaft reaches a position at which the shaft and opening grooves come into registry, allowing the wire ring to expand outwardly into the shaft opening groove in an attempt to reach its free-state shape. Ring expansion is limited by the total depth of the shaft opening groove being less than the diameter of the wire resulting in an interference between the seated wire and the shaft groove which locates and retains the shaft in the shaft opening of the lifter body.

5 Claims, 4 Drawing Sheets

VALVE ACTUATION ASSEMBLY

TECHNICAL FIELD

The invention relates to valve lifters for an internal combustion engine.

BACKGROUND

U.S. Pat. No. 5,361,733 issued in the name of Spath et al. discloses a roller direct acting hydraulic valve lifter having a roller and shaft assembly received in recesses in the end of the lifter body. The rollers engage the cams and are rotatably carried by suitable bearing members supported on the axle shafts. The shafts may be press-fit or staked in corresponding bores in the lifter body. The design, while effective at reducing friction between the follower and the cam surface may, in some instances prove difficult to manufacture in that it requires access to the inner ends of the shaft during assembly, sufficient hole length to develop retention strength and resist cracking of the lifter body due to staking stress, and a shaft with a hard center portion, to support the roller and softer end portions to receive the stake. Additionally, rotational fixation of the shaft within the follower body operates to concentrate shaft wear since the shaft is unable to rotate and distribute the effects of such wear over the entire shaft surface. Conventional staking processes may not be applicable due to limited access to the inner shaft end and, in addition, to thin shaft openings in the lifters which require softer shaft ends. The softer shaft end portions limit the retention strength which can be achieved without cracking the lifter body. Ceramic shafts, which are beneficial in terms of friction, resistance to wear and cost, cannot be retained using a conventional shaft staking technique due to the extreme hardness of the material.

SUMMARY OF THE INVENTION

In a preferred embodiment of the invention, an internal combustion engine includes a camshaft and a plurality of roller hydraulic valve lifters. The camshaft carries sets of cams which act on corresponding rollers mounted on shafts within valve lifter bodies. Retention of the roller shafts within each lifter body is through the use of a flexible c-ring which engages circumjacent internal and external ring grooves located in the shaft opening in the lifter body and on the outer circumference of the roller shaft. The shaft groove includes straight-sided and full-radius portions combining to provide a total depth which is at least equal to the diameter of the wire from which the c-ring is constructed. The shaft opening groove is limited to a full-radius portion having a total depth less than that of the wire diameter. The c-shaped ring is formed so that, in its free state, it has an outside diameter larger than the diameter of the groove in the shaft opening but, in an elastically collapsed state, its outside diameter is not larger than the shaft diameter.

During installation of the roller-shaft assembly into the lifter body, the c-shaped ring is elastically collapsed into the shaft groove which, as indicated, has a total depth which will accommodate the diameter of the wire. As such, the shaft and wire ring may be inserted into the shaft openings in the lifter body with little effort until the shaft reaches a position at which the shaft and the opening grooves come into registry, allowing the wire ring to expand outwardly into the shaft groove in an attempt to reach its free-state diameter. Ring expansion is limited by the total depth of the shaft opening groove, being less than the diameter of the wire, resulting in an interference between the seated wire and the shaft groove which locates and retains the shaft in the shaft opening of the lifter body.

The roller shaft is located in position, within the lifter body, through the action of the c-shaped retainer and the corresponding roller shaft and lifter body grooves and cannot be removed unless sufficient force is exerted to shear the wire ring. Due to the high shear strength of the wire and the substantial cross-sectional area of the c-shaped ring, a small wire diameter can provide substantial shaft retention capability.

The invention provides a simplified scheme for the retention of the roller shaft within the shaft openings of a lifter body which dispenses with the need for mechanically deforming the shaft or body. Additionally, the disclosed shaft retention is suitable for application to openings where access to the inner end of the roller shaft may not be possible.

In addition, because the lifter body, roller shaft and retaining ring may be constructed of fully hardened materials, retention reliability may be improved over conventional mechanical deformation methods of shaft retention which typically require softer components.

The present invention will now be described, by way of example, with reference to the accompanying drawings.

BRIEF DRAWING DESCRIPTION

DETAILED DESCRIPTION OF THE PREFERRED EMBODIMENT

Figure 1:
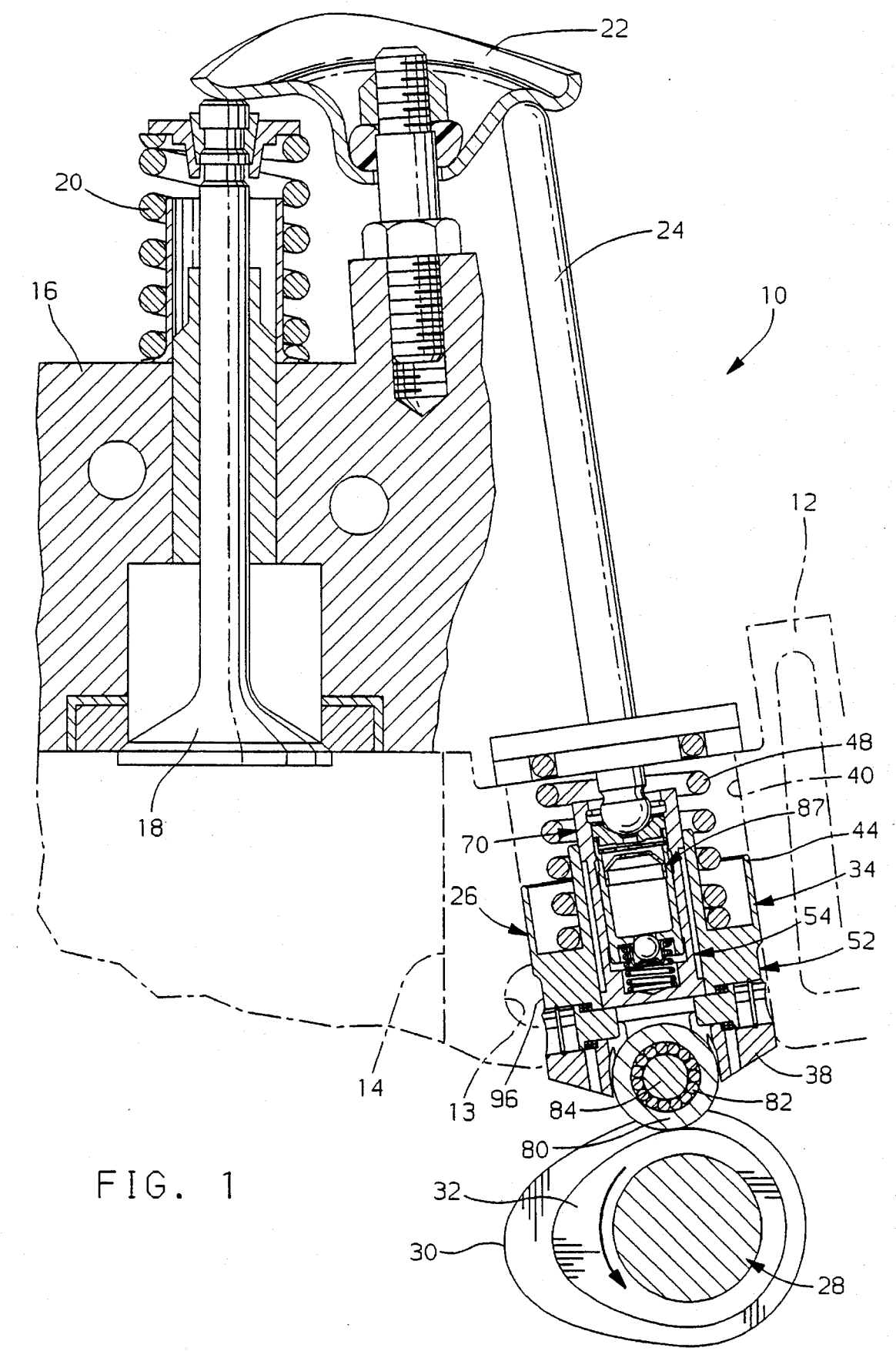
FIG. 1 is a partially schematic cross-sectional view of an engine having a valve actuation assembly according to the present invention.

Referring to FIG. 1 of the drawings in detail, an overhead valve, cam in block, reciprocating piston engine 10 has a push-rod/rocker arm type valve gear. The engine includes a cylinder block 12 having at least one cylinder 14 closed by a cylinder head 16. The cylinder head carries at least one inlet valve 18 and one exhaust valve, not shown, controlling ports connecting with the engine cylinder. Each valve 18 is biased closed by a spring 20 and is opened by valve gear such as a rocker arm 22 actuated by a push rod 24, a valve lifter 26 and an associated cam shaft 28. The exhaust valves may be actuated by conventional devices or by lifters in accordance with the present invention, but in the illustrated example, the lifter for each inlet valve 18 is a two-step variable hydraulic valve lifter. The lifter 26 is selectively actuated by a pair of spaced, high lift cams 30 and a central, low lift cam 32 located on the camshaft 28 between the high lift cams 30.

Figure 2:
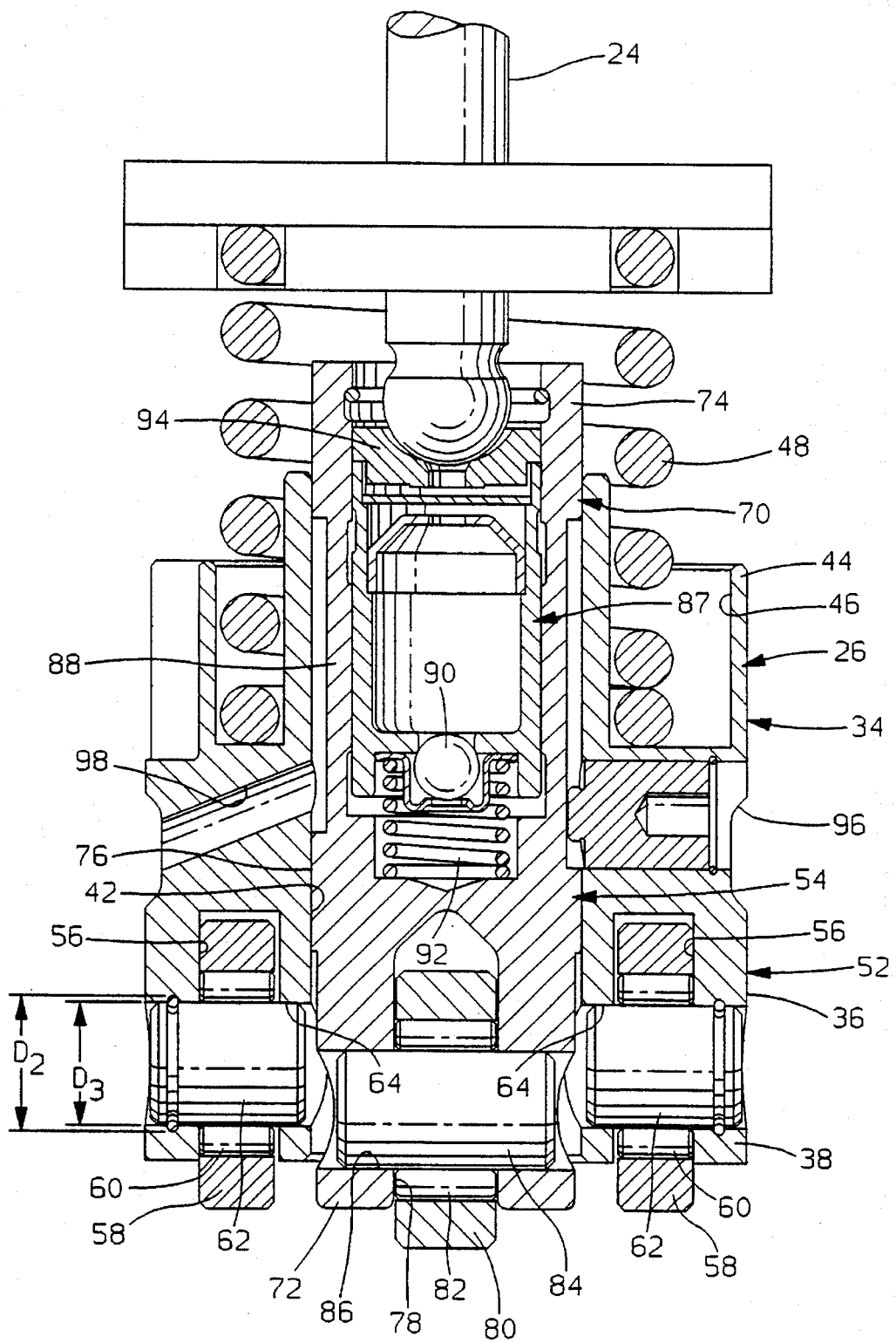
FIG. 2 is a side view of the valve lifter incorporated in the assembly of FIG. 1.

The lifter, FIG. 2, includes a high lift outer cam follower 52 actuated by the high lift cams 30 and a low lift inner follower 54 actuated by the low lift cam 32. The outer follower 52 has a cylindrical annular body 34 that is reciprocable in lifter bore 40 of the engine block 12. A first end 38 of the body 34 includes slots or recesses 56 which carry a pair of rollers 58 for engaging the spaced, high lift cams 30 of the camshaft 28 while the opposite second annular end 44 of the body 34 includes a recess 46 in which a return spring 48 is seated. The rollers 58 may ride on bearings 60, such as needles, which are carried on axle pin shafts 62 carried in transverse bores 64 in the body 34. The body also has a concentric cylindrical inner surface 42 for receiving low lift, inner follower 54.

The low lift inner follower 54 includes a hollow piston 70 with a first end 72, an open end 74 and a cylindrical wall 76 reciprocably engaging the cylindrical inner surface 42 of the body 34. The first end 72 carries, in recess 78, a single follower roller 80 engageable with the central low lift cam 32 and rotatably carried on bearings 82 which ride on a shaft 84. The shaft 84 is received in a transverse bore 86 in the piston 70. The low lift inner follower 54 further includes hydraulic lash adjusting element 87 including a plunger 88, check ball 90 and spring 92. A pushrod seat 94 mounts against the plunger 88 in a counterbore in the open end 74 of the piston 70.

An annular or arcuate groove 96 extending about the outer surface 36 of the lifter body 34, receives oil from gallery 13 in the cylinder block 12 and delivers it, through an oil passage 98 to the interior of the hollow piston 70 for supplying oil to the hydraulic element assembly 87.

Referring now to FIGS. 3–6, retention of the roller shafts 62 within the transverse openings 64 of the inner and outer skirts 36,42 is through the use of a wire c-shaped ring 100 which engages circumjacent internal and external, annular ring grooves 102 and 104 located in the shaft opening 64 of the lifter body 34 and located about the circumference of the outer surface of the roller shafts 62, respectively. The wire, from which the c-shaped ring 100 is constructed may be of any suitably shear resistant material having the spring characteristics required by the following description. Examples of such materials are metallic materials, ceramics, and/or polymers.

Figure 3:
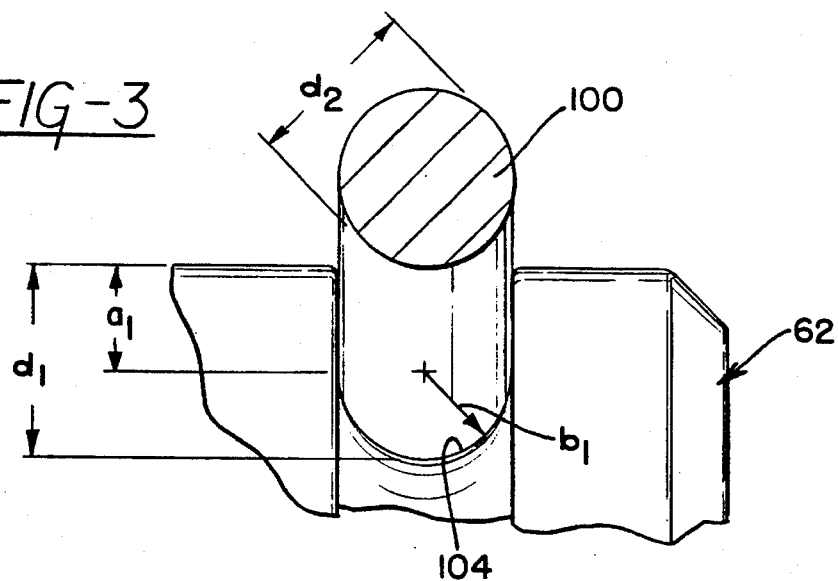
FIG. 3 is a partial, enlarged view of FIG. 2 showing additional details of the present invention.
Figure 7:
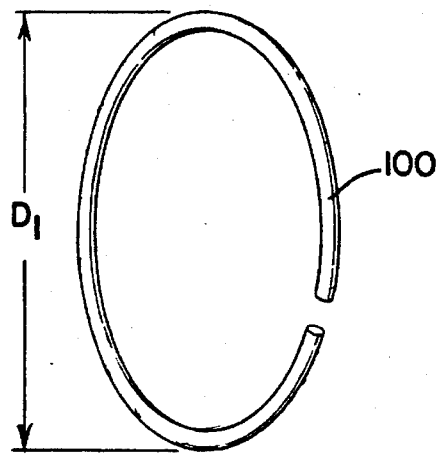
FIG. 7 illustrates an embodiment of a c-shaped retention ring embodied in the present invention.

In the preferred embodiment shown, the roller shaft ring groove 104 includes a straight-sided portion $a_1$ and a full radius portion $b_1$, FIG. 3, which combine to provide a total groove depth $d_1$ which is at least equal to the diameter $d_2$ of the wire used to construct the c-shaped ring 100. Annular groove 102 in the shaft opening 64 in skirt 36 of the lifter body 34 is limited to a full-radius portion $b_2$ having a total depth $d_3$ which is less than the diameter $d_2$ of the c-shaped ring 100. The c-shaped ring 100 is formed such that, in its free-state, FIG. 7, it has an outside diameter $D_1$ larger than the diameter $D_2$ of the annular groove 102 in the shaft opening 64 but, in an elastically collapsed state, FIG. 5, its outside diameter is not larger than the shaft diameter $D_3$. (See FIG. 2)

Figure 4:
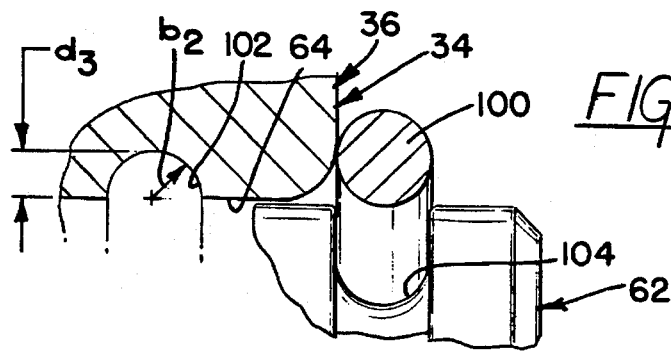
FIGS. 4, 5 and 6 are partial, enlarged views of the valve lifter of FIG. 2 illustrating the lifter body, roller shaft and c-ring at various degrees of shaft installation.
Figure 5:
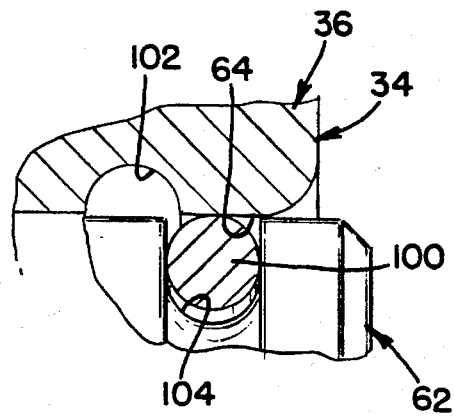
Figure 6:
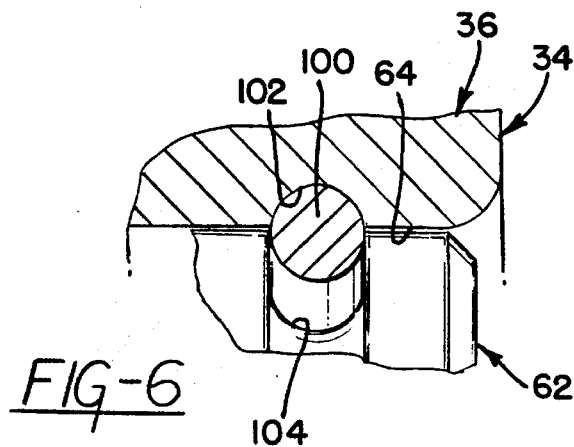

Installation of the roller shaft 62, FIG. 4–6, into the transverse bores 64 of the inner and outer skirt portions 42,36 of the lifter body 34 require that the c-shaped ring 100 be elastically collapsed into the shaft groove 104, FIG. 5, which, as indicated, has a total depth $d_1$ which will accommodate the full diameter $d_2$ of the wire. As such, the shaft 62 and the collapsed ring 100 may be inserted into the shaft opening 64 in the lifter body 34 with little effort until the shaft 62 reaches a position, shown in FIG. 6, at which the shaft groove 104 and the shaft opening groove 102 come into axial registry with one another. Upon alignment of the grooves 104,102, the collapsed ring 100 expands outwardly and into the shaft opening groove 102 in an attempt to reach its free-state diameter $D_1$. Ring expansion is limited, however, by the total diameter $D_2$ (see FIG. 2) of the annular groove 102 of the shaft opening 64. More importantly, the expansion of the ring 100 into the wall of the shaft opening is limited by the total depth $d_3$ of the shaft opening groove 102 which is less than the diameter $d_2$ of the wire. As a result, an interference is established between the seated, c-shaped wire 100 and the shaft opening groove 102 which operates to locate and axially position the shaft 62 in the shaft opening 64 of the lifter body 34. While the interference established between wire 100, shaft groove 104 and shaft opening groove 102 is operable to prevent axial movement of the shaft 62 within the transverse bores 64 of the lifter body 34, such interference does not operate to limit rotational movement of the shaft 62 within the bores 64. As such, the shaft 62 may be allowed to rotate under the influence of the rollers 58 to thereby more evenly distribute wear loads over the entire outer surface of the shaft. Distribution of the loads, as described, will operate to significantly increase the service life of the shaft 62 and, consequently the entire follower assembly.

Figure 8:
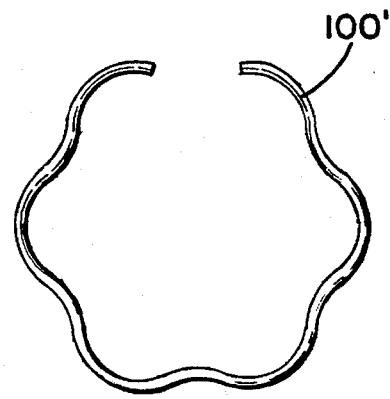
FIGS. 8 and 9 illustrate additional embodiments of a c-shaped retention ring of FIG. 7.
Figure 9:

In an alternative embodiment it is envisioned that the ring 100 may be formed in a shape other than that of a circular ring to provide increased prevailing load to resist shaft chucking or spinning tendencies. As an example, the ring 100' may utilize an undulating shape either within, or outside of the plane of the groove, FIGS. 8 and 9.

Figure 10:
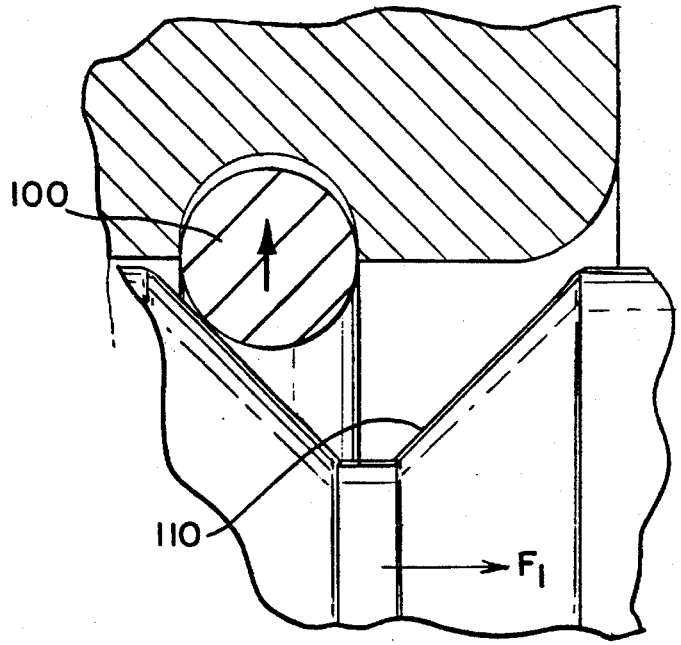
FIG. 10 illustrates an additional embodiment of a valve lifter embodying the present invention.

In an additional alternative embodiment of the present invention it is envisioned that the internal or external grooves may have advanced cross-sections such as the vee-shaped cross-section 110 shown in FIG. 10. The vee will operate, in the embodiment shown, to expand the ring 100 outwardly, in the direction of the arrow, under the influence of exerted axial shaft loading $F_1$.

A further envisioned embodiment of the disclosed invention reverses the location of the grooves on the shaft and in the shaft opening such that the straight-sided groove is located within the shaft opening while the shallower, full-radius groove is formed in the roller shaft. With such a configuration, the c-shaped ring is formed to have a free-state diameter which is smaller than the diameter of the annular shaft groove. Insertion of the roller shaft into the shaft opening, in this embodiment, functions to expand the ring into the outer, shaft opening groove until the two grooves are aligned. Upon alignment of the shaft and shaft opening grooves, the wire ring moves inwardly, towards its smaller free-state, until it is seated within the shaft groove. As a result, an interference is established between the seated, c-shaped wire and the shaft opening groove which operates to locate and lock the shaft in the shaft opening of the lifter body.

The invention disclosed herein provides an improved means for retaining roller shafts in roller hydraulic valve lifters of the type disclosed and in other valve train components where conventional staking, riveting or press fitting methods of shaft retention are not desired. The present invention is applicable to the retention of shafts of varied material and hardness such as ceramics which do not easily lend themselves to conventional fixing operations.

While the present invention has been disclosed with respect to a roller hydraulic valve lifter having two shaft supported rollers for contact with corresponding cam surfaces, it is contemplated that the invention has applicability to any valve train components which utilize such shaft mounted rollers to minimize friction at the lifter cam interface and, in addition, to valve train components having a shaft-hole relationship of the type described in which a roller may not be supported.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A valve actuation assembly comprising a cam follower including a follower body configured to receive a roller assembly therein, said roller assembly comprising a roller, rotatably mounted on a shaft, said shaft having an end engageable in a shaft opening in said cam follower for support therein, said shaft including an annular shaft groove configured to receive a wire, c-shaped ring, said shaft groove having a total depth accommodating the diameter of said wire, and said shaft opening having an annular groove configured to receive a portion of said wire, c-shaped ring when said shaft is located in said shaft opening and said shaft groove is in registry with said shaft opening groove, such that an interference is established between said wire, c-shaped ring, said shaft opening groove and said shaft groove to thereby retain said roller shaft within said shaft opening in said follower body.

2. A valve actuation assembly comprising a cam follower including a follower body configured to receive a roller assembly therein, said roller assembly comprising a roller, rotatably mounted on a shaft, said shaft having first and second ends engageable in shaft openings in said cam follower for support therein, said shaft including an annular shaft groove configured to receive a wire, c-shaped ring, said shaft groove having a total depth accommodating the diameter of said wire, one of said shaft openings having an annular groove configured to receive a portion of said wire, c-shaped ring when said shaft is located in said shaft openings and said shaft groove is in axial registry with said shaft opening groove, such that said wire, c-shaped ring is permitted to expand outwardly from said shaft groove and partially into said shaft opening groove to establish an interference between said wire, c-shaped ring, said shaft opening groove and said shaft groove to thereby axially retain said roller shaft within said shaft openings in said follower body.

3. A valve actuation assembly comprising a cam follower including a follower body configured to receive a roller assembly therein for engaging the cam surface of a rotatable camshaft, said roller assembly comprising a roller, rotatably mounted on a central portion of a shaft, said shaft having first and second ends engageable in shaft openings in said follower body for support of said shaft therein, said shaft including an annular shaft groove having a straight portion and a full radius portion configured to receive a wire, c-shaped ring therein, said straight portion and said full radius portion combining to define a groove depth configured to accommodate the diameter of said wire, and one of said shaft openings having an annular groove having a total depth less than that of said wire diameter and configured to receive a portion of said wire, c-shaped ring when said shaft is located in said shaft openings and said shaft groove is in axial alignment with said shaft opening groove, such that said wire, c-shaped ring is permitted to expand outwardly from said shaft groove and partially into said shaft opening groove to establish an interference between said wire, c-shaped ring, said shaft opening groove and said shaft groove to thereby axially retain said roller shaft within said shaft openings in said follower body.

4. A valve actuation assembly comprising a cam follower including a follower body configured to receive a roller assembly therein for engaging the cam surface of a rotatable camshaft, said roller assembly comprising a roller, rotatably mounted on a central portion of a shaft, said shaft having first and second ends engageable in shaft openings in said follower body for support of said shaft therein, said shaft including an annular shaft groove having a straight portion and a full radius portion configured to fully receive a wire, c-shaped ring therein, and one of said shaft openings having an annular groove having a total depth configured to receive a portion of said wire, c-shaped ring, said wire, c-shaped ring having an uncompressed diameter larger than the diameter of said shaft and compressible in said shaft groove to a diameter less than or equal to said diameter of said shaft, said shaft locatable within said shaft openings in said follower body with said shaft groove in axial alignment with said shaft opening groove, such that said wire, c-shaped ring is permitted to expand outwardly from said shaft groove towards its uncompressed diameter to thereby partially engage said shaft opening groove to establish an interference between said wire, c-shaped ring, said shaft opening groove and said shaft groove to thereby axially retain said roller shaft within said shaft openings in said follower body.

5. A valve actuation assembly comprising a cam follower including a follower body configured to receive a roller assembly therein, said roller assembly comprising a roller, rotatably mounted on a shaft, said shaft having an end engageable in a shaft opening in said cam follower for support therein, said shaft opening having an annular groove, having a total depth configured to accommodate the diameter of a wire, c-shaped ring and said shaft including an annular shaft groove configured to receive a portion of said wire, c-shaped ring when said shaft is located in said shaft opening and said shaft groove is in registry with said shaft opening groove, such that an interference is established between said wire, c-shaped ring, said shaft opening groove and said shaft groove to thereby axially retain said roller shaft within said shaft opening in said follower body.

* * * * *